Jan. 25, 1927.
B. F. SHAUGHNESSY
1,615,410
COMBINATION TOOL
Filed Oct. 9, 1925   2 Sheets-Sheet 1
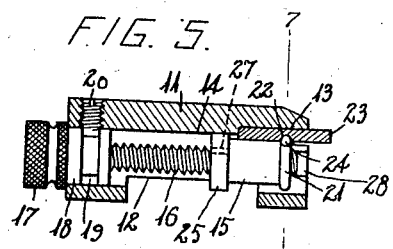
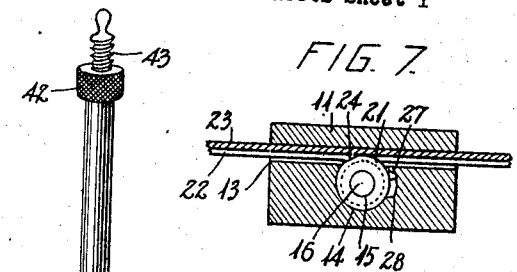
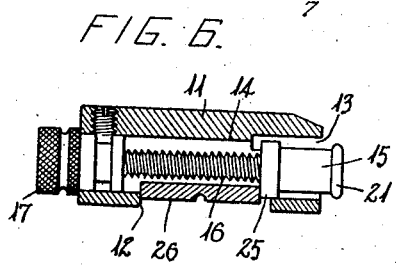
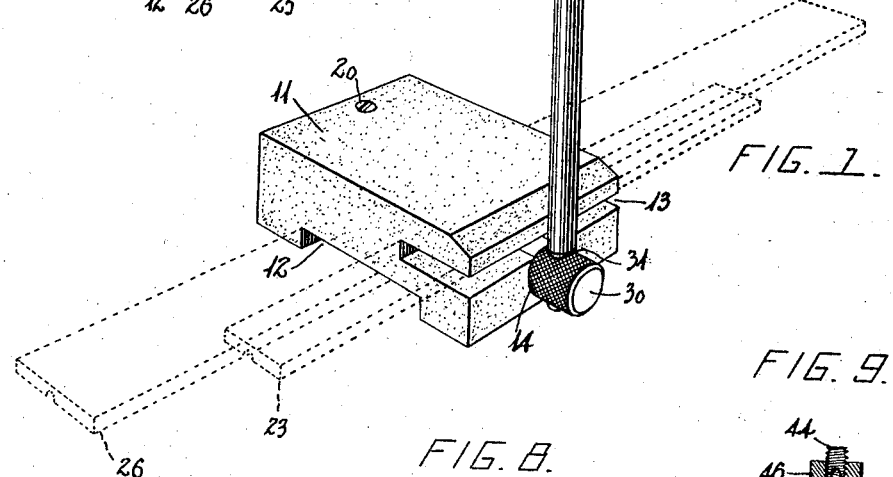
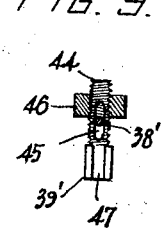
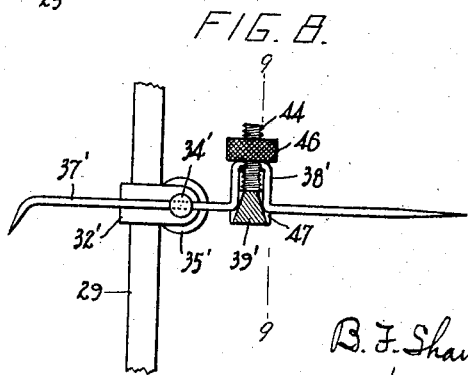
Inventor:
B. F. Shaughnessy
By Monroe E. Miller
Attorney.

Jan. 25, 1927.
B. F. SHAUGHNESSY
1,615,410
COMBINATION TOOL
Filed Oct. 9, 1925 2 Sheets-Sheet 2
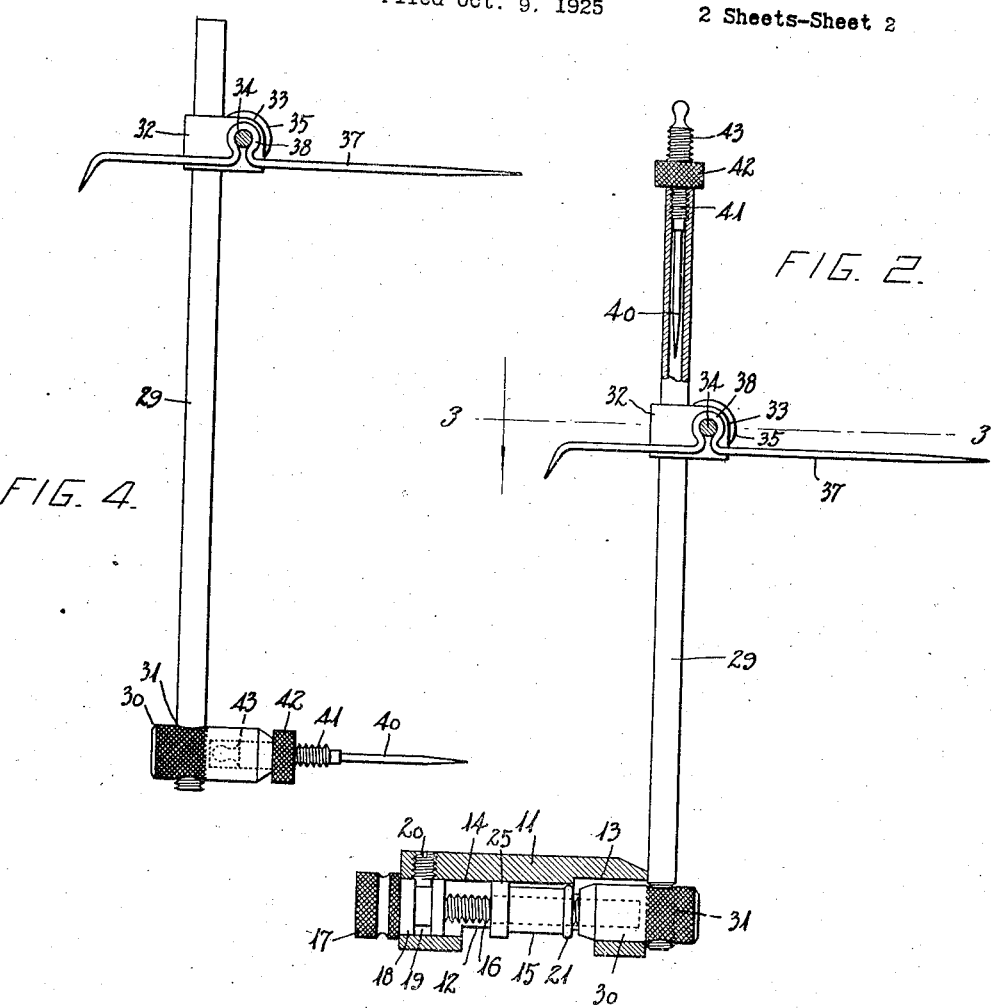
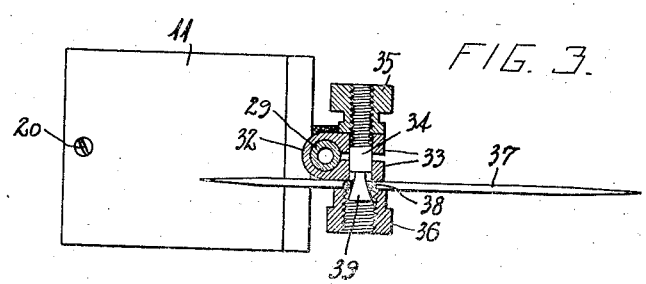

Patented Jan. 25, 1927.

1,615,410

UNITED STATES PATENT OFFICE.

BERNARD F. SHAUGHNESSY, OF BROOKLYN, NEW YORK.

COMBINATION TOOL.

Application filed October 9, 1925. Serial No. 61,579.

The present invention relates to combination tools, and aims to provide a combination tool adapted especially for use by machinists and mechanics in laying out and doing machine work, and the like, it being the object of the invention to provide a novel instrument for use in machine shops and for other similar purposes which will combine several useful tools and give the device a wide range of use.

Another object of the invention is the provision of a body or base having novel means for attaching rulers or straightedges of different sizes thereto and for fastening other objects to said body or base, in order that it has a wide range of use.

A further object is the provision of an improved surface gage wherein the stylus or needle may be adjusted in a simple and efficient manner.

A still further object of the invention is to provide a surface gage which may be readily converted into a compass or dividers.

It is also an object of the invention to improve the device generally in its construction and details to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a perspective view of the device as used as a surface gage, rulers or straightedges being shown in dotted lines.

Fig. 2 is a side elevation of the device as seen in Fig. 1, with the body or base and upper portion of the spindle or rod shown in section.

Fig. 3 is a horizontal section taken on the line 3—3 of Fig. 2.

Fig. 4 is an elevation showing the surface gage converted into a compass or dividers, the clamping bolt of the stylus or needle being shown in section.

Fig. 5 is a section of the body, corresponding to Fig. 2, showing one arrangement in fastening a ruler or straightedge to the body.

Fig. 6 is a view corresponding to Fig. 5 showing another arrangement of fastening a ruler or straightedge to the body.

Fig. 7 is a section on the line 7—7 of Fig. 5.

Fig. 8 is an elevation of a modified form of stylus or needle, the wedge being shown in section.

Fig. 9 is a section on the line 9—9 of Fig. 8.

In carrying out the invention there is provided a body or base 11 of suitable size and of rectangular form, which is provided with the slot or channel 12 and the slot or groove 13. For convenience the body 11 will be described in the position as shown in Figs. 1 and 2 when it serves as a base for the surface gage, although said body may be disposed in various positions when using same for different purposes, as will hereinafter more fully appear. The slot 13 is located at the forward end of the body 11 and extends from side to side, while the channel 12 is located in the bottom surface of the body, with the body in the position shown. The body 11 also has a bore or opening 14 extending longitudinally therethrough from its forward to its rear end and intersecting the lower surface of the slot 13 and the upper surface of the channel 12. The base 11 may be readily die cast so as to be inexpensively manufactured, without machine work, and in order that the surfaces of the body or block 11 will resist wear, it being understood that the metal alloy used in die casting is not especially hard, small particles of steel or other hard metal may be distributed throughout the metal alloy of which the body or block 11 is molded. Thus, the hard particles may be mixed with the molten alloy before casting, and will not melt, inasmuch as they are of a higher melting point temperature than that of the metal alloy, so that when the body or block is cast, the particles will be distributed throughout the mass. This will distribute the particles throughout the surfaces of the body or block and they will resist wear.

A cylindrical nut 15 is slidable within the bore 14 for clamping rulers and other objects to the body 11, and is adjusted by means of a screw 16 disposed axially within the bore 14 and threaded within the nut. Said screw has a head or knob 17 at the rear end of the body 11 with a neck portion 18 fitted snugly for rotation within the rear end of the bore 14. Said portion 18 has an annular groove 19 receiving a screw or element 20 carried by the body 11 in order to swivel the screw 16 within the body and prevent longitudinal displacement of said screw unless the screw 20 is removed. By rotating the head or knob 17 the nut 15 is made to travel forwardly or rearwardly in the body 11.

The nut 15 is provided at its forward end with an annular bead or flange 21 to engage in the longitudinal groove 22 of a ruler or straightedge 23 inserted into the slot 13. Thus, by sliding the ruler 23 longitudinally of itself into the slot 13 the groove 22 may engage the flange 21, with the grooved side of the ruler lowermost, and the opposite side of the ruler bears upwardly against the upper surface of the slot 13. Then, by turning the screw 16 the nut 15 may be moved rearwardly to clamp the rear edge of the ruler or straightedge 23 against the rear surface or wall of the slot 13, as seen in Fig. 5. This will rigidly clamp the ruler 23 to the body or block 11, and said body with the ruler attached may be used as a square, by placing either side of the body 11 against an object with the ruler or straightedge 23 overlapping the object, and the device may be used in various ways with the ruler and body secured together. The flange 21 is cut away, as at 24, so that when the nut 15 is turned with said cutaway or flattened portion 24, parallel with the upper surface of the slot 13, the ruler 23 may be readily slid into and out of the slot 13, and when the ruler is positioned within said slot, the nut 15 may be turned so that the flange 21 clamps, by cam action, the ruler 23 against the opposite surface of the slot 13, as seen in Fig. 7. In this way, the flange 21 not only engages in the groove 22 for drawing the ruler 23 into the slot 13, but also serves as a cam to clamp the ruler against the surface of the slot 13 opposite to said flange.

The nut 15 is provided at its rear end with an annular flange or collar 25 projecting into the channel 12, to provide means for securing a ruler or straightedge 26 or other object in the channel 12. Thus, the ruler 26 or other object is positioned within the channel 12 between the collar or flange 25 and the rear edge of the channel 12, as seen in Fig. 6, and by adjusting the nut 15 rearwardly by rotating the screw 16, the ruler or object 26 is clamped securely in place. With the ruler 26 secured in the channel 12 the device may be used as a square, with the bottom or either side of the body 11 bearing against an object and the ruler 26 overlapping the object. It is also possible to secure a stylus, needle or other object in the channel 12 by clamping it between the nut 15 and the rear edge or wall of the channel 12.

Rulers of different widths may be accommodated by the nut 15 in either the slot 13 or the channel 12, the nut 15 being adjustable to accommodate rulers of different sizes, as will be apparent.

In order to prevent the nut 15 from rotating, but to permit of limited turning movement of said nut, the collar or flange 25 has a lug 27 within a groove 28 in the body 11 along one side of the bore or opening 14. Said groove 28 is sufficiently wide to permit the nut 15 to turn a limited amount so that the portion 24 may be moved to and from a position parallel with the upper surface of the slot 13 for releasing and clamping the ruler 23. When the screw 16 is turned in one direction this will turn the nut 15 to bring the portion 24 parallel with the upper surface of the slot 13 so that the ruler may be readily inserted in or removed from the slot 13, the lug 27 contacting with the lower edge or wall of the groove 28. Then, when the ruler 23 is inserted and the screw 16 rotated in the other direction to clamp the ruler 23 in the slot 13, the nut 15 is rotated so that the flange 21, will by cam action, clamp the ruler 23 against the upper surface of said slot 13.

The body or block 11 also serves as the base of the surface gage, and the screw 16 is employed for securing the spindle or rod 29 to the body 11 by means of a member 30. Said member 30 is of cylindrical form and has a screw-threaded aperture so as to screw over the terminal of the screw 16, similar to a cap nut, and the member 30 has a diametrical threaded aperture or opening 31 through which the lower terminal of the spindle or rod 29 is screw-threaded. In attaching the spindle or rod 29 to the body 11, the nut 15 is moved rearwardly so that the member 30 may be screw-threaded on the screw 16 without touching said nut, and the spindle 29 is then screw-threaded through the aperture 31. The screw 16 is then rotated to clamp the spindle 29 against the forward end of the body 11, and said spindle 29 may be disposed vertically or in an inclined position.

A split clamp or slide 32 embraces the spindle 29 for sliding and turning movement, and has the spaced ears 33 provided with apertures through which a clamping and pivot bolt 34 extends, and nuts 35 and 36 are screw-threaded on the opposite terminals of the bolt 34 to press the ears 33 together and secure the clamp 32 in adjusted position on the spindle 29. The stylus, needle or pointer 37 is composed of resilient wire, and is formed between its ends or points with a loop 38 embracing the bolt 34 to pivotally connect said stylus with the clamp or slide 32, permitting the stylus 37 to be adjusted to different angular positions around the axis of the bolt 34, which, with the adjustment of the clamp or slide 32 on the spindle 29, and the adjustment of the spindle 29 relatively to the body 11, will enable the stylus 37 to be given its rough adjustment, while the stylus itself is adjustable to obtain a fine or accurate adjustment. Thus, the bolt 34 has a tapered or wedge portion 39 within the loop 38, and by tightening the nut 35 so as to secure the clamp 32 on the spindle 29, the tapered portion 39 is drawn further into the loop 38, thereby expanding said loop and springing the stylus 37 in order to adjust the point or points thereof, so as to obtain an accurate adjustment. The nut 36 may then be tightened to clamp the stylus 37 and its loop 38 against the corresponding ear 33. This provides a simple and effective means for obtaining the adjustment of the stylus, inasmuch as the rough adjustment is quickly obtained, and then, by rotating the nut 35, the stylus itself may be sprung to obtain a fine or minute adjustment.

The spindle or rod 29, clamp 32, stylus or needle 37 and member 30 are also used, in combination with a needle or pointed member 40, as a compass, dividers, or the like. The needle 40 has a screw-threaded portion 41 screw-threaded into the upper terminal of the spindle or rod 29, which is tubular or hollow, so as to normally house the needle 40 within said spindle. The needle 40 has a screw-threaded terminal portion 43, and a collar 42 between the portions 41 and 43. The portion 43 is screw-threaded similarly to the screw 16, so as to screw into the member 30, as seen in Fig. 4. The needles 37 and 40 may be used as the scribers or points of the compass or dividers, and the clamp 32 may be adjusted on the rod or spindle 29 for obtaining a rough adjustment, after which the stylus or needle 37 may be sprung to obtain an accurate adjustment in the same way as when obtaining the fine adjustment when using the device as a surface gage as above described.

Figs. 8 and 9 illustrate a modified form of stylus. The stylus 37' extends through an aperture in the clamping bolt 34' of the clamp 32' so that the stylus is clamped against the side of the clamp 32' when the nut 35' on the bolt 34' is tightened, which also tightens the clamp 32' on the rod or spindle 29. The stylus 37' has the loop or offset portion 38' that may be spaced more or less from the bolt 34', and a wedge 39' is disposed within the open end of the loop 38' and has a stem 44 provided with a slot 45 through which the yoke portion of the loop 38' extends. A nut 46 is screw-threaded on the stem 44 and bears against said yoke portion to draw the wedge 39' into the loop 38' so as to spread or separate the arms of said loop and spring the stylus in order to obtain an accurate adjustment of the corresponding point or terminal of the stylus. The wedge 39' preferably has opposite grooves 47 receiving the arms of the loop 38' to prevent the wedge from turning and to maintain the wedge 39' and loop 38' in proper relative position in the plane of the loop 38'.

By the employment of the resilient stylus with means for springing the stylus, it is possible to quickly obtain a rough adjustment of the stylus, after which the stylus may be sprung to obtain an accurate adjustment thereof, and the final adjustment of the stylus is obtained without disturbing the other adjustments. The loop 38 of the stylus 37 also enables the stylus to be readily applied to and removed from the bolt 34 by springing the loop 38 laterally over and off the bolt.

Having thus described the invention, what is claimed as new is:—

1. In a device of the character described, a resilient stylus comprising a length of wire formed between its ends with a loop, and means for expanding said loop including a wedge portion movable into the loop.

2. In a device of the character described, a resilient stylus formed from a length of wire having a loop between its ends, and a pivot and clamping member extending through said loop and having a wedge portion to engage in the loop for expanding the loop, said stylus being adapted to be turned around said member on said wedge portion thereof.

3. In a device of the character described, a resilient stylus formed from a length of wire having a circular loop between its ends, and a bolt having a tapered portion engaging in said loop to expand the loop, said loop being rotatable around said tapered portion.

4. In a device of the character described, an adjustable member, a bolt carried thereby, and a stylus having a resilient loop secured to said member by said bolt, the bolt having a portion to engage in and spread said loop to adjust the stylus.

5. In a device of the character described, an adjustable member, a bolt carried by said member, and a resilient stylus having a resilient loop embracing said bolt, the bolt having a tapered portion engaging in said loop to expand the loop when the bolt is tightened so as to spring the stylus.

6. In a device of the character described, a rod, a split clamp on the rod, a bolt extending through said clamp, nuts on the terminals of said bolt, and a stylus having a resilient loop embracing said bolt between said clamp and one of said nuts, said bolt having a tapered portion engaging in said loop to expand the loop when the bolt is tightened.

7. In a device of the character described, a body having an opening, a screw swivelled to the body within said opening, a member having a threaded aperture to engage said screw and having another threaded aperture at an angle to the firstnamed aperture, a spindle to engage in the secondnamed aperture and to be clamped against said body, and a stylus carried by said spindle.

8. A device according to claim 7, in combination with a needle having a screw-threaded portion to engage in the first mentioned aperture of said member when said member is detached from said screw.

9. A device of the character described comprising a body having an opening, a screw swivelled to said body and located within said opening, a member having a screw-threaded aperture to engage said screw and a screw-threaded aperture at an angle to the firstnamed aperture, a spindle having one terminal screw-threaded to engage in the secondnamed aperture and to be clamped against said body, and a stylus mounted on said spindle, in combination with a needle removably disposed in the other terminal of said spindle and having a screw-threaded terminal opposite to the pointed end of the needle to engage in the firstnamed aperture of said member when said member is disengaged from said screw.

10. In a device of the character described, a body having a slot, a straight edge in said slot having a groove at one side, a screw swivelled to said body, and a nut on the screw mounted for limited turning movement in said body, said nut having a flange to engage in said groove and formed to have a cam action by the turning movement of the nut to clamp the straightedge against the opposite side of the slot.

11. In a device of the character described, a body having a slot and an opening intersecting said slot, a straightedge disposed in said slot and having a groove, a screw swivelled to said body in said opening, and a nut mounted on the screw and movable in said opening, said nut being adapted to turn in said opening and having a flange to engage in the groove of said straightedge and provided with a portion to engage and disengage the straightedge when the nut is turned in said opening.

12. In a device of the character described, a body having a slot and an opening intersecting said slot, a straightedge in said slot having a groove, a screw swivelled to said body within said opening, and a cylindrical nut on the screw within said opening having a flange to engage in said groove, said flange being formed to clamp, by cam action, the straightedge against the opposite side of the slot when the nut is turned by the rotation of the screw in one direction, the body having a groove extending along said opening, and the nut having a lug in said groove to limit the turning movement of the nut.

In testimony whereof I hereunto affix my signature.

B. F. SHAUGHNESSY.